Oct. 11, 1932.  J. GENTILE  1,882,138
SAFETY AND EMERGENCY BUMPER BRAKE AND LOCKING MECHANISM
Filed May 20, 1931   3 Sheets-Sheet 1
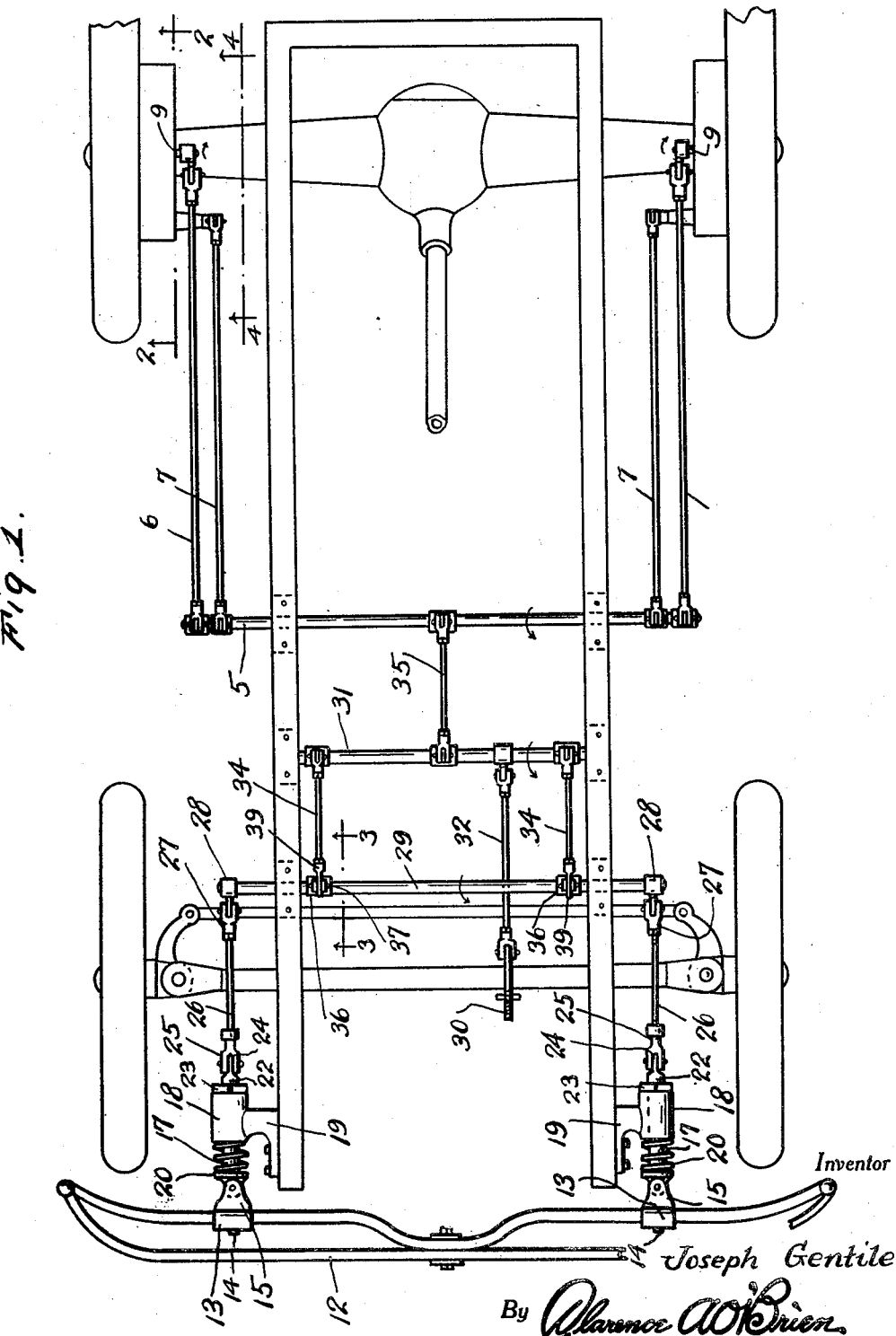
Inventor
Joseph Gentile
By Clarence A. O'Brien
Attorney

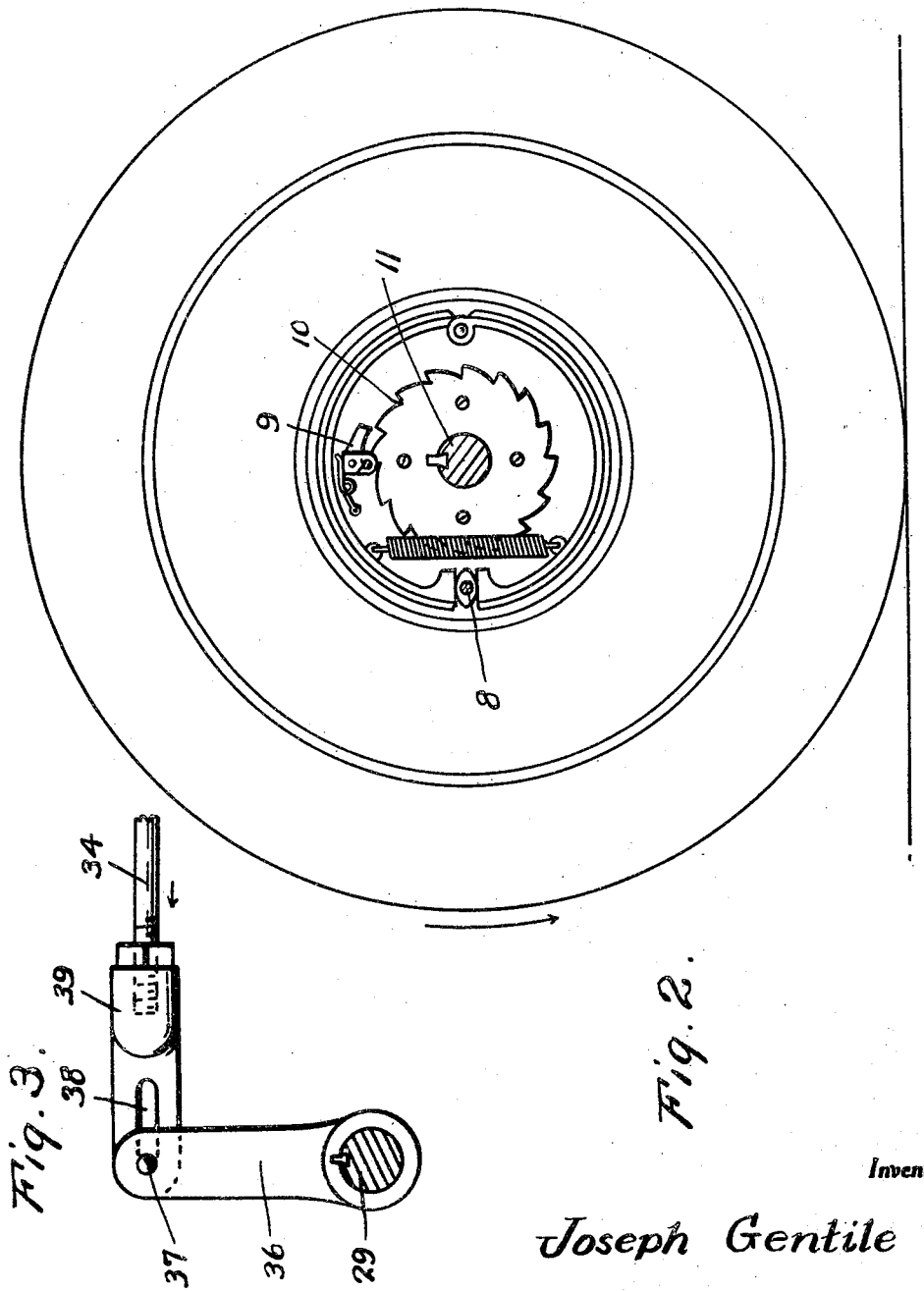

Oct. 11, 1932. J. GENTILE 1,882,138
SAFETY AND EMERGENCY BUMPER BRAKE AND LOCKING MECHANISM
Filed May 20, 1931 3 Sheets-Sheet 3
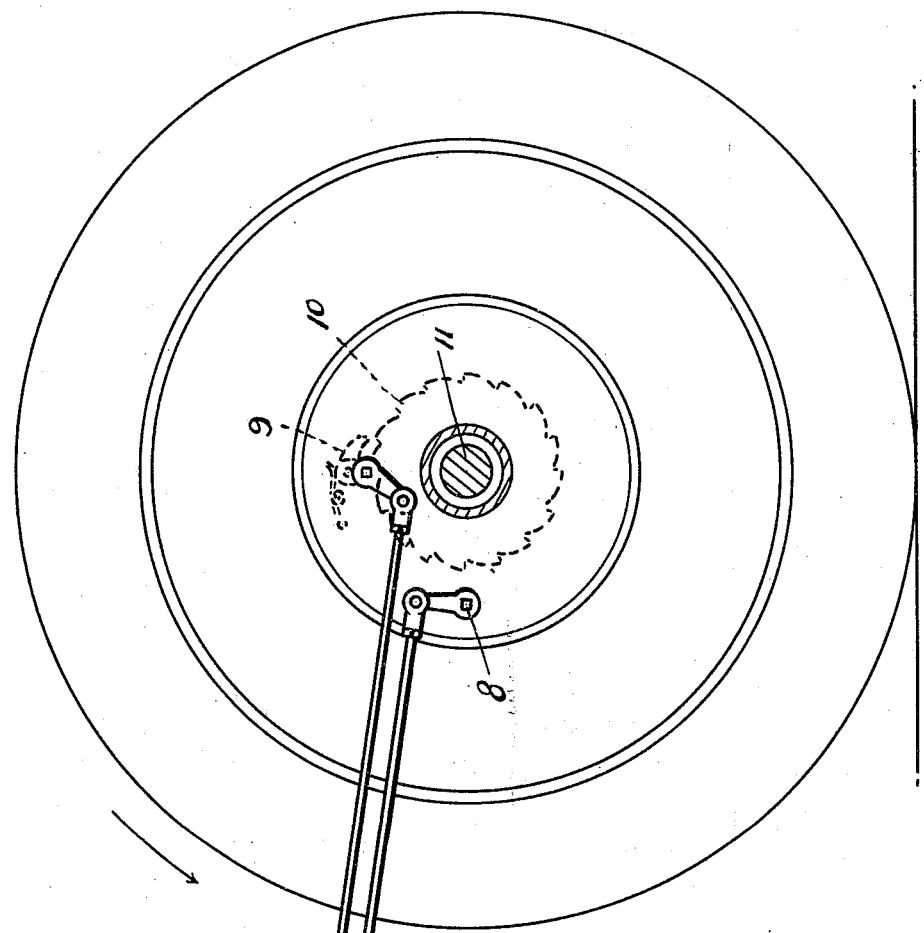
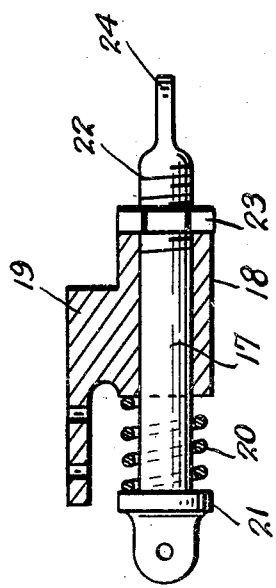
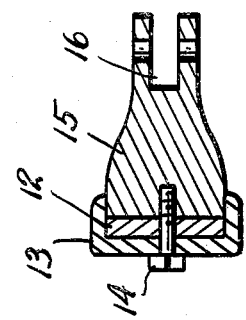
Inventor
Joseph Gentile
By Clarence AO'Brien
Attorney Patented Oct. 11, 1932

1,882,138

UNITED STATES PATENT OFFICE

JOSEPH GENTILE, OF EAST BOSTON, MASSACHUSETTS

SAFETY AND EMERGENCY BUMPER BRAKE AND LOCKING MECHANISM

Application filed May 20, 1931. Serial No. 538,851.

This invention appertains to new and useful improvements in means for locking the brakes of a vehicle in an emergency.

The principal object of this invention is to provide a bumper operated brake mechanism, wherein the brakes will be locked when the mechanism is actuated.

Another important object of the invention is to provide a mechanism of the character mentioned which in operation will be positive acting, fool-proof and not susceptible to the development of ready defects, and which will absorb shocks during impact with another car.

These and other important objects and advantages of the invention will become apparent to the reader of the following specification.

In the drawings:—

Figure 1 represents a top plan view showing the chassis of an automobile and the mechanism diagrammatically set out.

Fig. 2 represents a vertical sectional view taken substantially on the line 2—2 of Fig. 1.

Fig. 3 represents a sectional view taken substantially on the line 3—3 of Fig. 1.

Fig. 4 represents a sectional view taken substantially on the line 4—4 of Fig. 1.

Fig. 5 represents a horizontal sectional view through one of the guide brackets and associated structures.

Fig. 6 represents a vertical sectional view through one of the bumper bar clamps.

Referring to the drawings wherein like numerals designate like parts, it can be seen in Fig. 1, that the numeral 5 is the shaft journalled thru the chassis and having a pair of connecting rods 6—7, connected to each end thereof. These connecting rods at each end of the shaft 5 connect to the corresponding rear wheel, the connecting rod 7, leading to the brake cam 8, while the rod 6 leads to the pawl 9 which when operated engages the ratchet wheel 10 on the axle 11.

In further carrying out the invention, numeral 12 represents the usual bumper of an automobile and to the inner bar of this bumper U-members 13—13 are applied. The bight portion of each U-member has an opening therein for receiving the screw 14 which passes through an opening in the bar of the bumper to thread into the blocks 15, which fit between the legs of the corresponding U-member 13.

The rear end of this block 15 is bifurcated as at 16, to accommodate the forward end of the corresponding bar 17, which is slidable through the barrel 18 on the bracket 19. On each of these bars 17 is a compressible spring 20, interposed between the head 21 on the forward end thereof, and the forward end of the barrel 18, while the opposite end of the bar 17 is threaded as at 22 to accommodate the jamb nut 23, which is feedable against the rear end of the barrel 18 as in the manner substantially shown in Fig. 5.

The rear end of the bar 17 is provided with a reduced, apertured extension 24 through which the yoke 25 on the forward end of the connecting rod 26 pivotally connects, the yoke 27 on the rear end of the connecting rod 26 being pivotally connected to a bell crank 28 on the corresponding end of the shaft 29, which is rotated in the direction of the arrow when the bumper 12 is forced rearwardly.

Numeral 30 represents the usual shank of the foot pedal which is connected to the shaft 31 by the connecting rod 32. Connecting rods 34—34 are interposed between the shafts 29 and 31, while a single connecting rod 35 is interposed between the shaft 31 and the shaft 5.

Obviously, when the emergency apparatus is in operation, the shaft 31 rotates in a direction opposite to the direction it is operated in when actuated by the foot pedal 30, and takes care of the motion that would be imparted to the brake pedal by this reverse action of this shaft 31, and it can be seen that the arms 36 on the shaft 29 to which the connecting rods 34—34 are connected are provided with pins 37 which extend through slots 38 in the heads 39 on the adjacent ends of the corresponding connecting rods 34, so that when the connecting rods 34 are moving in the direction of the arrow in Fig. 3, the brake pedal will not be affected.

In viewing Fig. 1, it can be seen that when the bumper is forced rearwardly, the shafts 29, 31 and 5 will each be operated in a given direction, so that the auxiliary brake rod 7 will operate the brakes of the rear wheels simultaneously with the operation of the rocking means involving the pawl 9 and ratchet wheel 10.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

The combination with a motor vehicle having a frame and a braking system, of a bumper having inner and outer leaves, endwise movable bars connected to the inner leaf of the bumper leaving the outer leaf of the bumper free to absorb minor shocks, brackets carried by said frame and slidably supporting said bars, springs on said bars and engaged with said brackets, links connected to said bars, a transverse rod having the terminal portions thereof provided with cranks connected to said links, and means connecting said rod to the braking system.

In testimony whereof I affix my signature.

JOSEPH GENTILE.